United States Patent [19]

Milewski et al.

[11] Patent Number: 4,912,973
[45] Date of Patent: Apr. 3, 1990

[54] MULTIPLE POINT VELOCITY PROBE

[75] Inventors: Les Milewski, Clearwater; Ivan Doskocil, Palm Harbor, both of Fla.

[73] Assignee: Metal Industries, Clearwater, Fla.

[21] Appl. No.: 257,704

[22] Filed: Oct. 14, 1988

[51] Int. Cl.$^4$ .............................. G01F 1/46; G01F 5/00
[52] U.S. Cl. ..................................... 73/202; 73/861.66
[58] Field of Search .................. 73/861.66, 202, 202.5, 73/861.65

[56] References Cited

U.S. PATENT DOCUMENTS

| | | |
|---|---|---|
| 1,145,222 | 7/1915 | Wilkinson . |
| 1,250,238 | 12/1917 | Spitzglass . |
| 1,645,449 | 10/1927 | Proebstel . |
| 3,581,565 | 6/1971 | Dieterich . |
| 3,685,355 | 8/1972 | DeBaun . |
| 3,733,900 | 5/1973 | DeBaun . |
| 3,748,901 | 7/1973 | DeBaun . |
| 3,765,241 | 10/1973 | Rambert ............................ 73/861.66 |
| 3,981,192 | 9/1976 | Bauder . |
| 4,030,358 | 6/1977 | Noll . |
| 4,297,900 | 11/1981 | Brandt, Jr. . |
| 4,344,330 | 8/1982 | Renken et al. . |
| 4,375,769 | 3/1983 | Brandt, Jr. . |
| 4,481,829 | 11/1984 | Shortridge . |
| 4,498,347 | 2/1985 | Grantham et al. . |
| 4,602,514 | 7/1986 | Kurrle et al. .................... 73/861.66 |

*Primary Examiner*—Herbert Goldstein
*Attorney, Agent, or Firm*—Frijouf, Rust & Pyle

[57] ABSTRACT

A device for measuring the velocity of a fluid such as gas or air, traveling through a duct, which device relies upon a series of precisely controlled apertures for gathering a plurality of fluid samples and presenting the summation of the samples to a central velocity sensor. The device precisely controls the volume of the fluid which can flow across the sensor, thereby preventing pressure gradients within the measuring device from modifying the velocity measurements.

12 Claims, 2 Drawing Sheets

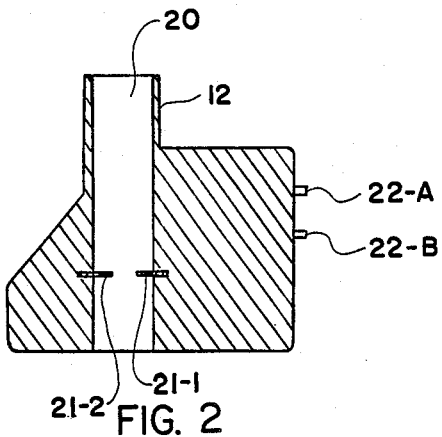
FIG. 2
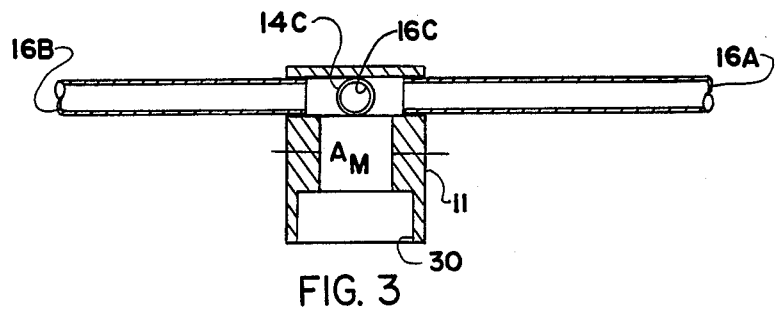
FIG. 3
A: $A = \dfrac{\pi D^2}{4}$
B: $D = \sqrt{\dfrac{4A}{\pi}}$
C: $D_I = \dfrac{D_M}{\sqrt{N_I \cdot N_A}}$
D: $D_M = D_I \sqrt{N_I \cdot N_A}$
E: $D_A = \dfrac{D_M}{\sqrt{N_A}}$
F: $D_A = D_I \sqrt{N_I}$
G: $D_I = \dfrac{D_A}{\sqrt{N_I}}$
WHERE I, A & M REFER TO INLET, ARM & MANIFOLD, RESPECTIVELY. THUS:
$A_I$ = AREA OF EACH INLET
$N_I$ = NUMBER OF INLETS
FIG. 4

MULTIPLE POINT VELOCITY PROBE

BACKGROUND OF THE INVENTION

1. Field of the Invention

This invention relates to a device for measuring the velocity of a fluid and more particularly to the measurement of the velocity of gas or air flowing in a confined duct.

2. Description of the Prior Art

Over the years it has become necessary to obtain precise measurements of the flow rate of a fluid such as air or gas through a duct. Usually, these flow rate measurements are required in order to control the pressure, volume, temperature or velocity of the fluids. The flow rate in a duct can be different at different positions in the duct. The physical structure of the duct may even make the flow rate different at different positions in a single transverse plane extending through the duct. Accordingly, the measuring devices of the prior art experienced different flow rate measurements depending upon the physical structure of the duct and the location of the measuring device within the duct.

One partial solution to the problem with respect to the measurement of gas flow in a duct can be seen from U.S. Pat. No. 4,602,514, issued to H. Kurrle, et al. on July 29, 1986, which patent is hereby incorporated by reference herein. The Kurrle patent uses a series of spaced collecting pipes with each pipe having a number of apertures therein for collecting the flowing gas in a duct. The gas flowing into the apertures is funneled to a central point and the volume of the collected gas is measured. The Kurrle patent incorporates rectangular collecting pipes and fins for directing the flowing gas into the apertures of the collecting pipes. Unfortunately, the rectangular collecting pipes and fins of the Kurrle patent distorts the quantity of the gas flowing into the apertures of the collecting pipes.

Thus, there is a need in the art for an accurate velocity measuring device capable of mounting within a fluid carrying duct and capable of sampling the fluid within the duct without regard to the internal structure of the duct. There is a further need in the art for a fluid measuring device having a fluid gathering structure which does not interfere significantly with the fluid flow in the duct.

Therefore, it is an object of this invention to provide an improved sensor for determining the velocity of fluid movement incorporating receiving means for receiving samples of fluids and for communicating the received fluid samples to a manifold and wherein the fluid samples to flow unimpeded through the manifold to a velocity measuring device.

Another object of this invention is to provide an improved sensor for determining the velocity of fluid movement incorporating receiving means for receiving samples of fluids and for communicating the received fluid samples to a manifold wherein fluid samples received by the receiving means communicates to the manifold without restricting the volume of fluid flow from the receiving means.

Another object of this invention is to provide an improved sensor for determining the velocity of fluid movement incorporating receiving means includes a plurality of arms with each arm having a plurality of inlet apertures.

Another object of this invention is to provide an improved sensor for determining the velocity of fluid movement incorporating receiving means includes a plurality of arms with each arm having a plurality of inlet apertures and wherein the cross-sectional area of the receiving means as a function of the cross-sectional area of the apertures.

Another object of this invention is to provide an improved sensor for determining the velocity of fluid movement incorporating receiving means having inlet apertures dispersed within a duct parallel to the fluid flow within the duct.

Another object of this invention is to provide an improved sensor for determining the velocity of fluid movement which is suitable for use for with a variety of conventional velocity measuring devices.

Another object of this invention is to provide an improved method for determining the velocity of fluid movement incorporating the steps of receiving within a plurality of inlet apertures samples of the fluids, communicating the received fluid samples to a manifold, combining the fluid samples within the manifold without restricting the volume of fluid received by the manifold and delivering the combined fluid samples unimpeded to a velocity measuring device.

Another object of this invention is to provide an improved sensor for determining the velocity of fluid movement which is low in cost, highly accurate and reliable.

The foregoing has outlined some of the more pertinent goals of the present invention. These goals should be construed to be merely illustrative of some of the more pertinent features and applications of the invention. Many other beneficial results can be obtained by applying the disclosed invention is a different manner or modifying the invention within the scope of the disclosure. Accordingly, a fuller understanding of the invention may be had by referring to the summary of the invention and the detailed description describing the preferred embodiment in addition to the scope of the invention defined by the claims taken in conjunction with the accompanying drawing.

SUMMARY OF THE INVENTION

The invention is incorporated in the apparatus and method of determining the velocity of fluid movement. For the purposes of summarizing the invention, the invention is incorporated into a sensor for determining the velocity of fluid movement, the sensor comprising a manifold through which samples of the fluid can flow and receiving means for receiving samples of fluids and for communicating received fluid samples to the manifold. The receiving means includes a plurality of inlet apertures arranged into groups with each the group of inlet apertures receiving the fluid samples and communicating the fluid samples to the manifold via an individual one of the receiving means. The volume of fluids which can physically pass through the group of apertures associated with each the receiving means is physically restrained to be equal to or less than the volume of fluids which can be communicated by each the receiving means. The manifold is established for combining fluid samples received by the inlet apertures and communicated to the manifold without restricting the volume of fluid flow from the receiving means. The combined fluid samples flow unimpeded through the manifold to a velocity measuring device. The present invention is suitable for use with a variety of conventional velocity measuring devices.

In more specific embodiment of this invention, the cross-sectional area of the apertures is controlled to be a function of the cross-sectional area of the receiving means. In one embodiment, the receiving means includes a plurality of arms and wherein the controlling function between the diameter, and hence the cross-sectional area, of each the inlet aperture and the inside diameter, and hence the cross-sectional area, of each the arm is given by the formula $D_I = D_A/\sqrt{I}$, where $D_I$ = diameter of inlet aperture, $D_A$ = inside diameter of the arm and $N_I$ = number of inlet apertures. The receiving means includes a plurality of arms and wherein the controlling function between the diameter, and hence the cross-sectional area, of each the arm and the inside diameter, and hence the cross-sectional area, of each the aperture is given by the formula $D_A = D_I\sqrt{I}$, where $D_A$ = inside diameter of the arm, $D_I$ = diameter of inlet aperture and $N_I$ = number of inlet apertures. The inlet apertures dispersed within the duct are established perpendicular to the fluid flow within the duct. More specifically, the receiving means are a plurality of tubes having an open end and a closed end and wherein the manifold is a substantially hollow structure having apertures constructed in the sides thereof, the last-mentioned apertures adapted to accept the open end of the tubes. The manifold apertures are disposed on four opposite faces of the manifold and wherein the tubes are bent so that the closed ends of all four tubes lie along the flow direction of the fluid when the tubes are in mated relationship with the manifold apertures.

The invention is also incorporated into the method of determining the velocity of fluid movement, the method comprising the steps of receiving within a plurality of tubes via a plurality of inlet apertures arranged into groups, each group associated with one of the tubes, samples of fluids to be measured and communicating received fluid samples to a manifold central to all the receiving tubes, without restricting the volume of fluid received by the totality of all the inlet apertures. The method includes combining the communicated fluid samples within the manifold without restricting the volume of fluid received by the manifold from all the tubes delivering the combined fluid samples unimpeded to a velocity measuring device.

The fluid gathering principals inherent with using a plurality of extended tubes within a fluid carrying duct have been applied to design a fluid velocity sensor. Fluid gathering apertures are located on the tubes which extend radially outward from the central fluid gathering manifold. The apertures of each tube are constructed such that the sum of their fluid gathering openings is equal to, or less than, the inside fluid handling capacity of the tube. The central gathering manifold, in turn, has fluid handling capacity equal to the sum of the capacities of the fluid handling tubes. In this manner, back pressure does not affect the velocity of the fluid passing through the central gathering manifold. Fluids which pass though the tube apertures and into the central gathering port then flow past a velocity sensor.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawing in which:

FIG. 2 is a sectional view taken along line 2—2 of FIG. 1 showing internal details of one specific velocity measuring device suitable for use with the present invention;

FIG. 3 is a sectional view taken along line 3—3 of FIG. 1 showing internal details of the central gathering manifold; and FIG. 4 shows various formulas used to show relationships.

Similar reference characters refer to similar parts throughout the several views of the drawings.

DETAILED DESCRIPTION

Figure 1:
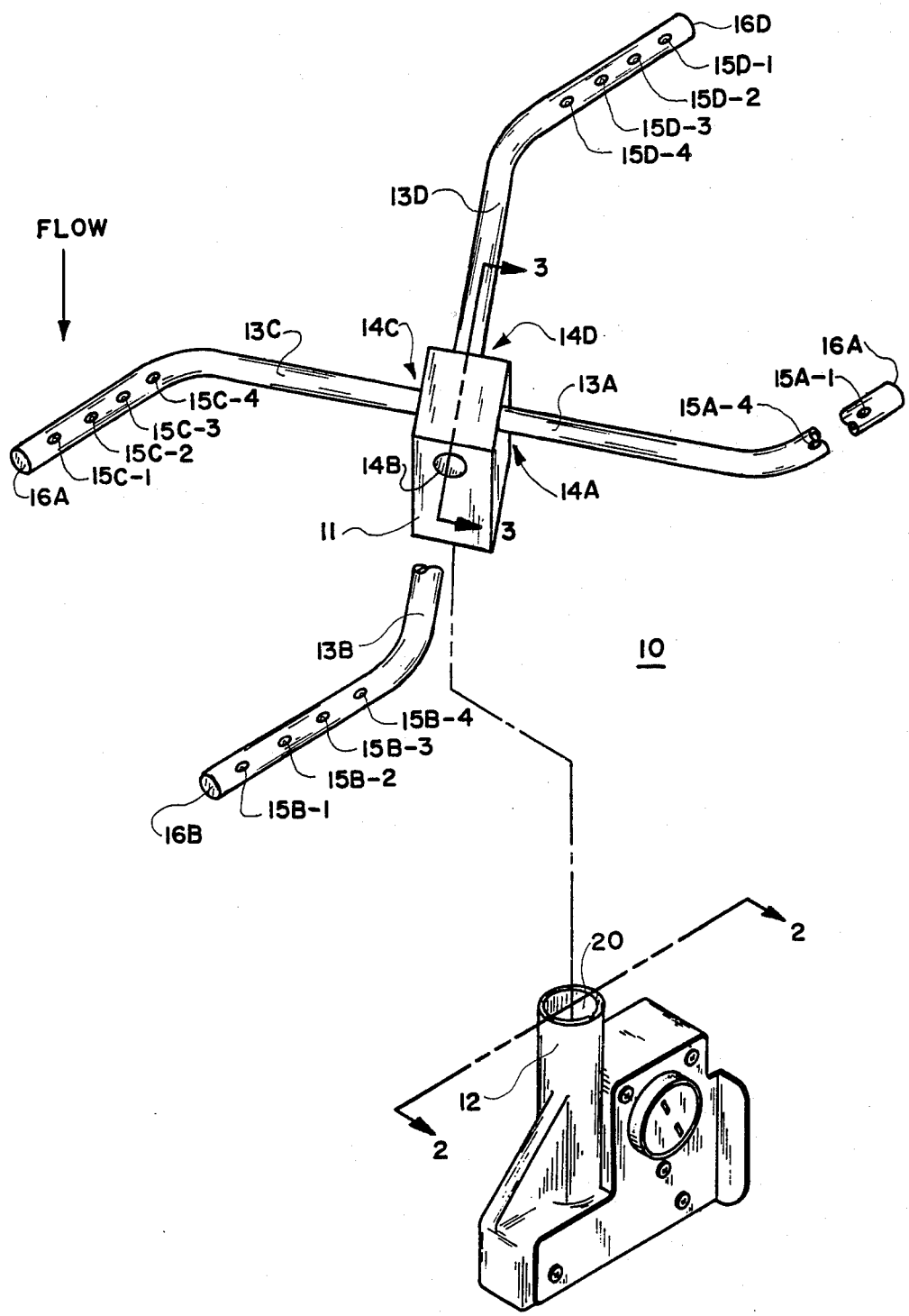
FIG. 1 shows a perspective view of the inventive sensing device having fluid gathering arms, a central gathering manifold, and a velocity measuring device.

FIG. 1 is an exploded view of a fluid velocity sensing device 10 of the present invention which is designed to be disposed within a duct (not shown) such as an air conditioning or heating duct. The fluid velocity sensing device 10 comprises a central manifold 11, a velocity measuring unit 12 and receiving means 13 shown as a plurality of hollow fluid gathering arms 13A, 13B, 13C and 13D. Each of the plurality of fluid gathering arms 13A 13B, 13C and 13D of FIG. 1 are hollow and extend from the central manifold 11. Preferably, each of the plurality of fluid gathering arms 13A, 13B, 13C and 13D are frictionally received in apertures 14A, 14B, 14C and 14D of the central manifold 11. An outer end 16A, 16B, 16C and 16D of the plurality of fluid gathering arms 13A 13B, 13C and 13D are closed to inhibit fluid flow therethrough.

Each of the plurality of fluid gathering arms 13A, 13B, 13C and 13D includes inlet means shown as a plurality of inlet ports 15. Fluid gathering arms 13A includes inlet ports 15A-1, 15A-2, 15A-3 and 15A-4 whereas fluid gathering arms 13B includes inlet ports 15B-1, 15B-2, 15B-3 and 15B-4. In a similar manner, fluid gathering arms 13C includes inlet ports 15C-1, 15C-2, 15C-3 and 15C-4 whereas fluid gathering arms 13D includes inlet ports 15D-1, 15D-2, 15D-3 and 15D-4.

When the plurality of fluid gathering arms 13A, 13B, 13C and 13D are frictionally received in apertures 14A, 14B, 14C and 14D of the central manifold 11, the inlet ports 15A-1, 15A-2, 15A-3, 15A-4, 15B-1, 15B-2, 15B-3, 15B-4, 15C-1, 15C-2, 15C-3, 15C-4, 15D-1, 15D-2, 15D-3 and 15D-4 lie perpendicular to the fluid flow direction as shown by the arrow. The combined opening areas of the four inlet ports in each of the fluid gathering arms is constructed to be equal to, or less than, the cross-sectional area of the inside of the fluid gathering arm. For example, the combined area of inlet ports 15A-1, 15A-2, 15A-3 and 15A-4 is equal to, or less than, the cross sectional area of the inside of the fluid gathering arm 13A.

As it will become apparent from the preferred design parameters set forth hereinafter, the number of inlets ports per fluid gathering arm is not critical. The relationship of the combined opening areas of the inlets ports per fluid gathering arm to the internal cross-sectional area of the fluid gathering arm is a critical factor. Preferably, diameter of each of the inlet ports is less than one-third the outer diameter of the fluid gathering arm. This relationship of the diameter of the inlet port to the outer diameter of the fluid gathering arm insures that the fluid flow enters the inlet ports in less turbulent manner. In contrast to the prior art, each of the fluid gathering arms is circular in cross-section without any directing fins. The circular cross-section and absence of fins provides a fluid flow into the inlet parts which is representative of the fluid flow within the duct.

FIG. 2 is a sectional view of the particular velocity measuring unit 12 shown in FIG. 1 but it should be understood that numerous other types and varieties of velocity measuring units may be suitable for use with the present invention. The velocity measuring unit 12 is of a standard design and should be well known to those skilled in the art. The velocity measuring unit 12 includes a channel 20 for receiving the flowing fluid. The flowing fluid passes through channel 20 and move past sensors tubes 21-1 and 21-2. The sensors tubes 21-1 and 21-2 are respectively connected to terminal ports 22-A and 22-B by means not shown. A second flow of fluid is established perpendicular to the flow of the fluid through channel 20 from sensor tube 21-1 to sensor tube 21-2 through terminal ports 22-A and 22-B by external means (not shown). The fluid flow through channel 20 deflects the second flow of fluid from sensor tube 21-1 to sensor tube 21-2 to alter the flow rate of the second fluid flow between terminal ports 22-A and 22-B. Accordingly, a variation in the flow rate of the fluid passing through channel 20 produces a variation in the deflection of the second flow of fluid from sensor tube 21-1 to sensor tube 21-2 and varies the flow rate of the second fluid flow from terminal port 22-A to terminal port 22-B. A measurement of the second flow rate of the second fluid flow between terminal ports 22-A and 22-B is indicative of the flow rate of the fluid passing through channel 20. The velocity measuring device set forth above is manufactured by Honeywell under the trademark "Velocitrol" (Part No. CP980).

FIG. 3 is a partial sectional view along line 3-3 of the fluid velocity sensing device 10 of FIG. 1. The manifold 11 includes a manifold port 25 which is in fluid communication with apertures 14A, 14B, 14C and 14D of the central manifold 11. A relief 30 in the manifold port frictionally receives the velocity measuring unit 12 and to communicate the manifold port 25 with channel 20. The moving fluid enters inlet ports 15A-1, 15A-2, 15A-3, 15A-4, 15B-1, 15B-2, 15B-3, 15B-4, 15C-1, 15C-2, 15C-3, 15C-4, 15D-1, 15D-2, 15D-3 and 15D-4 and flows through fluid gathering arms 13A 13B, 13C and 13D to enter apertures 14A, 14B, 14C and 14D of the central manifold 11. The moving fluid exits from apertures 14A, 14B, 14C and 14D and flows through manifold port 25 into channel 20. The manifold port 20 has an inside cross-sectional area $A_M$ which is equal to four times the inside cross-sectional areas of the fluid gathering arms 13A 13B, 13C and 13D. Accordingly, the fluid velocity sensing device 10 has a constant cross-sectional area from the inlet ports 15A-1, 15A-2, 15A-3, 15A-4, 15B-1, 15B-2, 15B-3, 15B-4, 15C-1, 15C-2, 15C-3, 15C-4, 15D-1, 15D-2, 15D-3 and 15D-4 to the channel 20 of the velocity measuring unit 12. The constant cross-sectional area of the fluid velocity sensing device 10 insures that there is no pressure increase or back pressure due to the design of the fluid velocity sensing device 10 as was found in the prior art devices. In addition, the distribution of the inlet ports 15A-1, 15A-2, 15A-3, 15A-4, 15B-1, 15B-2, 15B-3, 15B-4, 15C-1, 15C-2, 15C-3, 15C-4, 15D-1, 15D-2, 15D-3 and 15D-4 over a wide area of a duct insures that an accurate measurement is made of the velocity of the fluid in the duct.

FIG. 1 also illustrates a side bore 34 closed by a plug 36 in the central manifold 11 for receiving a velocity measuring device known as a thermo-anemometer or a hot wire fluid flow measuring device which should be well known to those skilled in the art. In a hot wire fluid flow measuring device (not shown), a wire is heated by an electrical current. The flow of the fluid through manifold 11 cools the heated wire in the hot wire sensor to vary the electrical current flow through the hot wire in accordance with the flow rate of the fluid through manifold 11. A detector (not shown) of conventional design, senses the current flow to indicate the flow rate of the fluid through manifold 11. One particular hot wire velocity measuring device as set forth above is known as an Alnor 8500. It should be appreciated by those skilled in the art that a pneumatic velocity measuring device such as the "Velocitrol" or the hot wire sensor velocity measuring device such as the Alnor 8500 or any equivalent type of types of velocity measuring device is suitable for use with the present invention.

FIG. 4 illustrate equations which may be used by one skilled in the art to design the fluid velocity sensing device 10 of the present invention to have the proper relative cross-sectional areas, given at least one of the cross-sectional variables, plus the number of fluid gathering arms 13 arms and number of inlet ports 15. For example, the diameter of the inlet ports ($D_I$) can be determined by equation C once one decides upon the diameter of the central manifold ($D_m$) and has determined the number of arms ($N_A$) there are to be and the desired number of inlets ($N_I$) per arm. Using equation D one can determine the diameter of the manifold ($D_m$) given the diameter of each inlet ($D_I$) hole, the number of such holes ($N_I$) and the number of arms ($N_A$).

For example, if the inside diameter of fluid gathering arm 13C is assumed to be 0.25 inches then the cross sectional area of the fluid gathering arm would be 0.049 square inches. This comes from the well-known formula shown in FIG. 4A. Accordingly, if the fluid gathering arm has four inlets ports having equal openings, each inlet port would then have an area of 0.01225 square inches. This translates to a diameter of 0.125 inches for each inlet port. This relationship is simplified and shown in FIG. 4G where $D_A$ (diameter of the fluid gathering arm) is assumed to be 0.25 square inches and $N_I$ (number of inlets ports per fluid gathering arm) is assumed to be 4.

Thus, in our example where there are four fluid gathering arms ($N_A=4$), each having a cross-sectional area of 0.049 square inches, the combined cross-sectional area $A_M$ of the manifold port 25 of manifold 11 would be 0.196 square inches. This results in a diameter ($D_M$) for the manifold port 25 of 0.5 inches.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A sensor for determining the velocity of fluid movement, said sensor comprising:
   a manifold through which samples of said fluid can flow;
   receiving means for receiving samples of fluids and for communicating received fluid samples to said manifold;
   said receiving means including a plurality of inlet apertures arranged into groups with each said group of inlet apertures receiving said fluid samples and communicating said fluid samples to said manifold via an individual one of said receiving means and wherein the total cross-sectional area of said group of inlet apertures associated with each said receiving means is equal to or slightly less than the total cross-sectional area of each said receiving means;
   means within said manifold for combining fluid samples received by said inlet apertures and communicated to said manifold for providing a uniform fluid flow from said receiving means; and
   means for allowing said combined fluid samples to flow through said manifold to a velocity measuring device.

2. The sensor set forth in claim 1 wherein said velocity measuring device measures the flow rate of said combined fluid samples through said manifold.

3. The sensor set forth in claim 1 wherein said total cross-sectional area of said receiving means is equal to or slightly less than the total cross-sectional area of a manifold port internal said manifold.

4. The sensor as set forth in claim 3 wherein said receiving means includes a plurality of arms and wherein the cross-sectional area of each of said inlet apertures and the inside diameter, and hence the cross-sectional area, of each said arm is given by the formula $D_I = D_A/\sqrt{I}$, where $D_I$ = diameter of inlet aperture, $D_A$ = inside diameter of the arm and $N_I$ = number of inlet apertures.

5. The sensor as set forth in claim 1 wherein said receiving means includes a plurality of arms and wherein the cross-sectional area of each of said arm and the inside diameter, and hence the cross-sectional area, of each said aperture is given by the formula $D_A = D_I\sqrt{I}$, where $D_A$ = inside diameter of the arm, $D_I$ = diameter of inlet aperture and $N_I$ = number of inlet apertures.

6. The sensor as set forth in claim 1, wherein said inlet apertures dispersed within said duct perpendicular to the fluid flow within said duct.

7. The sensor as set forth in claim 1 wherein said receiving means are a plurality of tubes having an open end and a closed end and wherein said manifold is a substantially hollow structure having apertures constructed in the sides thereof, said last-mentioned apertures adapted to accept said open end of said tubes.

8. The sensor as set forth in claim 7 wherein said manifold apertures are on four opposite faces of said manifold and wherein said tubes are bent so that the closed ends of all four tubes lie along the flow direction of said fluid when said tubes are in mated relationship with said manifold apertures.

9. A sensor for determining the velocity of fluid movement, said sensor comprising:
   a manifold having a plurality of manifold input apertures communicating with an internal manifold port;
   a plurality of receiving means communicating with said plurality of manifold input apertures, respectively;
   each of said plurality of receiving means having an internal channel defining an internal channel cross-section;
   each of said receiving means including a plurality of inlet apertures for receiving fluid samples of the fluid movement and communicating said fluid samples through said internal channel and said manifold port of said manifold to flow into said internal manifold port;
   total cross-sectional area of said plurality of inlet apertures of each of said receiving means being equal to or slightly less than the total cross-sectional area of each said internal channel of said receiving means; and
   total cross-sectional area of said internal channels of said plurality of receiving means being equal to or slightly less than the total cross-sectional area of said internal manifold port of said manifold for providing a uniform flow of the fluid samples of the fluid movement from said inlet apertures of plurality of receiving means to said internal manifold port.

10. The sensor for determining the velocity of fluid movement as set forth in claim 9, including a velocity measuring device for measuring the velocity of fluid flow within said internal manifold port of said manifold.

11. The sensor for determining the velocity of fluid movement as set forth in claim 9, wherein said the cross-sectional area of each said inlet apertures of said receiving means, and said internal channel cross-section area of each of said receiving means is given by the formula $D_I = D_A/N_I$, where $D_I$ = cross-sectional area of inlet aperture, $D_A$ = cross-sectional area of each of said internal channel of said receiving means and $N_I$ = number of inlet apertures.

12. The sensor for determining the velocity of fluid movement as set forth in claim 9, wherein said internal channel cross-section area of each of said receiving means and said cross-sectional area of said internal manifold port of said manifold is given by the formula $D_M = D_A N_I$, where $D_A$ = internal channel cross-section area of each of said receiving means, $D_M$ = cross-sectional area of said internal manifold port of said manifold and $N_I$ = number of receiving means.

* * * * *